US012752551B2

(12) United States Patent
Nakamura et al.

(10) Patent No.: US 12,752,551 B2
(45) Date of Patent: Oct. 6, 2026

(54) IMAGE FORMING APPARATUS WITH SUPPORT PLATE INCLUDING AIR INLET AND AIR VENT

(71) Applicant: KYOCERA Document Solutions Inc., Osaka (JP)

(72) Inventors: Satoru Nakamura, Osaka (JP); Yuzuru Yuasa, Osaka (JP); Noriaki Furukawa, Osaka (JP); Yuko Yano, Osaka (JP); Shimon Tasaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 136 days.

(21) Appl. No.: 18/770,722

(22) Filed: Jul. 12, 2024

(65) Prior Publication Data

US 2025/0026136 A1 Jan. 23, 2025

(30) Foreign Application Priority Data

Jul. 20, 2023 (JP) ................................ 2023-118456

(51) Int. Cl.
*B41J 11/00* (2006.01)

(52) U.S. Cl.
CPC .......... *B41J 11/0085* (2013.01); *B41J 11/007* (2013.01)

(58) Field of Classification Search
CPC ........ B41J 11/0085; B41J 11/007; B41J 2/01; B41J 13/103; B41J 13/0054; B41J 13/106; B41J 13/18; B41J 13/223; B41J 13/226; B41J 15/048; B41J 15/18; B41J 17/02
See application file for complete search history.

(56) References Cited

U.S. PATENT DOCUMENTS

2016/0214385 A1* 7/2016 Tsunemi .................. B41J 2/165

FOREIGN PATENT DOCUMENTS

JP 2006327725 A 12/2006
JP 2010023374 A 2/2010
JP 2018030691 A 3/2018

* cited by examiner

*Primary Examiner* — Kristal Feggins
(74) *Attorney, Agent, or Firm* — IP Business Solutions, LLC.

(57) ABSTRACT

An image forming apparatus includes: a recording head that ejects droplets onto a recording medium; an endless belt that conveys the recording medium toward a position where an image is to be formed on the recording medium by the recording head; a support plate that supports the endless belt; and a suction device which is located on an opposite side of the recording head relative to the endless belt and sucks the recording medium together with air to attract the recording medium to a surface of the endless belt. The support plate includes an air inlet and an air vent. The air sucked by the suction device passes through the air inlet from a side of the recording head toward the suction device. The air inside the suction device passes through the air vent from the suction device toward the endless belt.

2 Claims, 5 Drawing Sheets

IMAGE FORMING APPARATUS WITH SUPPORT PLATE INCLUDING AIR INLET AND AIR VENT

INCORPORATION BY REFERENCE

This application claims priority to Japanese Patent Application No. 2023-118456 filed on 20 Jul. 2023, the entire contents of which are incorporated by reference herein.

BACKGROUND

The present disclosure relates to image forming apparatuses.

There is generally known an image recording apparatus equipped with a conveying belt that conveys a sheet. The conveying belt is provided with: a large number of through holes through which air is sucked to attract a sheet to the surface of the conveying belt; and a plurality of through holes for flashing through which, during flashing, ink droplets ejected from nozzles pass.

SUMMARY

A technique improved over the aforementioned technique is proposed as one aspect of the present disclosure.

An image forming apparatus according to an aspect of the present disclosure includes a recording head, an endless belt, a support plate, and a suction device. The recording head ejects droplets onto a recording medium. The endless belt conveys the recording medium toward a position where an image is to be formed on the recording medium by the recording head. The support plate supports the endless belt. The suction device is located on an opposite side of the recording head relative to the endless belt and sucks the recording medium together with air to attract the recording medium to a surface of the endless belt. The support plate includes an air inlet and an air vent. The air sucked by the suction device passes through the air inlet from a side of the recording head toward the suction device. The air inside the suction device passes through the air vent from the suction device toward the endless belt.

DETAILED DESCRIPTION

Figure 1:
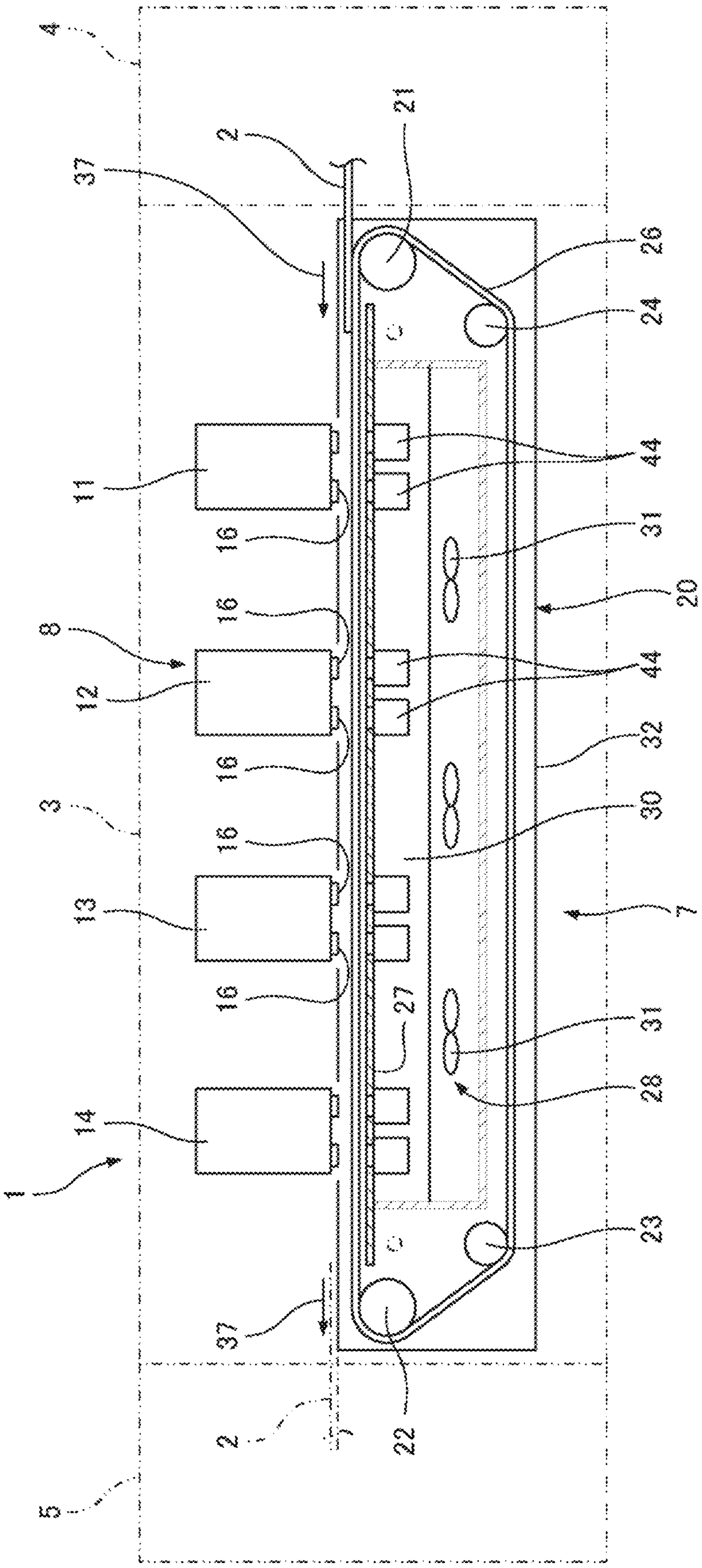
FIG. 1 is a schematic view showing the structure of an image forming apparatus.

Hereinafter, a description will be given of an embodiment of the present disclosure with reference to the drawings. Throughout the drawings, the same or equivalent parts and components are designated by the same reference characters and further description is omitted.

With reference to FIG. 1, an image forming apparatus 1 according to this embodiment will be described. FIG. 1 is a schematic view showing the structure of the image forming apparatus 1.

The image forming apparatus 1 is an apparatus that forms an image and is, for example, a color multifunction peripheral that has the function of executing a plurality of jobs, including copying, printing, scanning, and facsimile communication. The image forming apparatus 1 includes: a printing device 3 that records an image or others on a sheet 2 (an example of a recording medium defined in CLAIMS), for example, by an ink-jet system; a sheet feed device 4 that feeds the sheet 2 to the printing device 3; and a drying device 5 that dries the sheet 2 with the image or others recorded thereon.

The sheet 2 fed from the sheet feed device 4 to the printing device 3 is subjected to recording of an image or others in the printing device 3, then transferred from the printing device 3 to the drying device 5, dried in the drying device 5, and ejected.

The printing device 3 of the image forming apparatus 1 includes: a conveyance device 7 that conveys the sheet 2; and a recording device 8 that ejects ink onto the sheet 2 being conveyed. The recording device 8 includes a plurality of head units 11, 12, 13, and 14. Each of the head units 11 to 14 includes a plurality of recording heads 16.

The conveyance device 7 includes: a frame body 20; a plurality of rollers 21, 22, 23, and 24 rotatably mounted to the frame body 20; an endless conveying belt 26 (an example of an endless belt defined in CLAIMS) mounted around the rollers 21 to 24; a support plate 27 (referred to also as a platen) that supports the conveying belt 26 from below; and a suction device 28 that sucks the sheet 2 fed onto the conveying belt 26 to attract it to the surface of the conveying belt 26.

Figure 2:
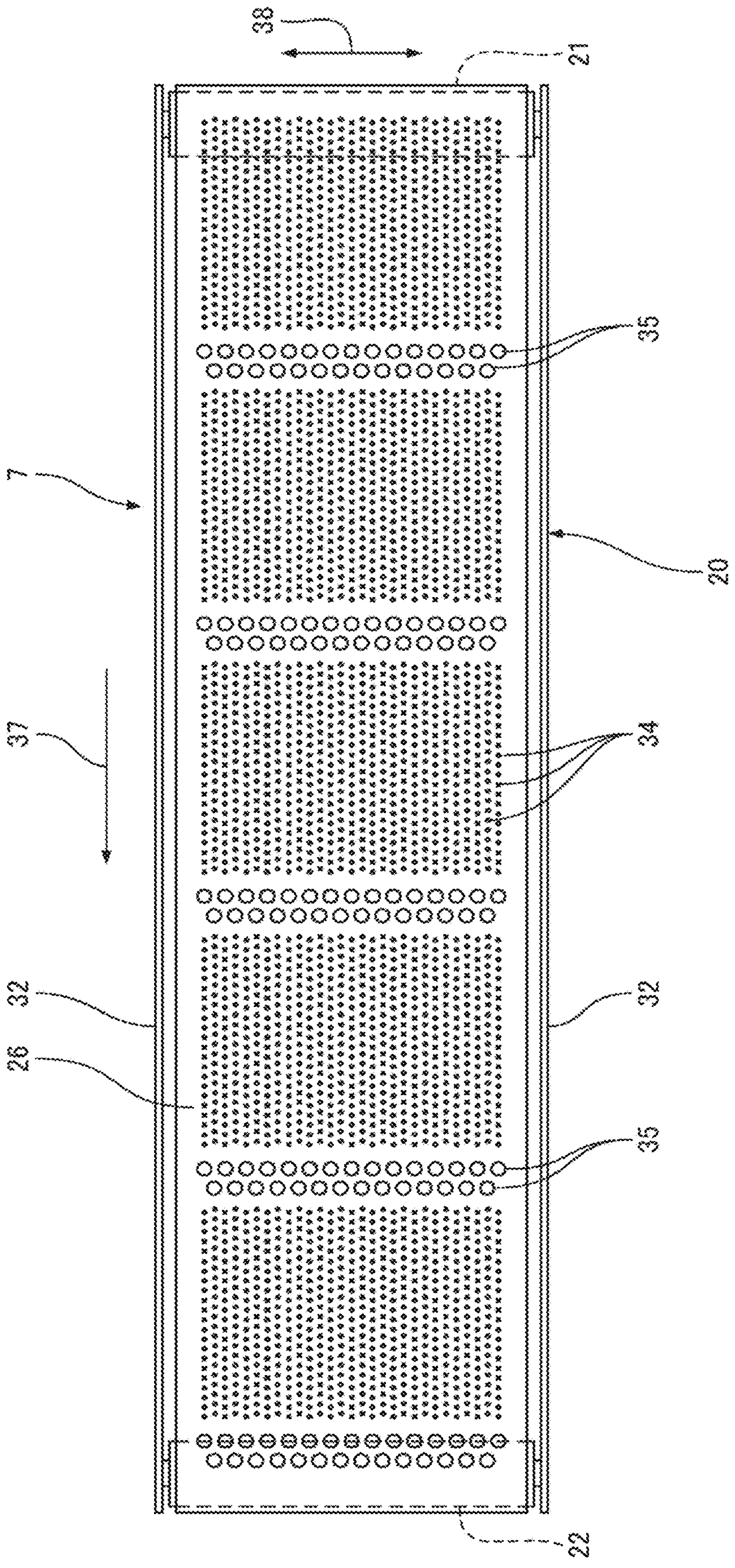
FIG. 2 is a plan view showing a conveyance device of the image forming apparatus.
Figure 3:
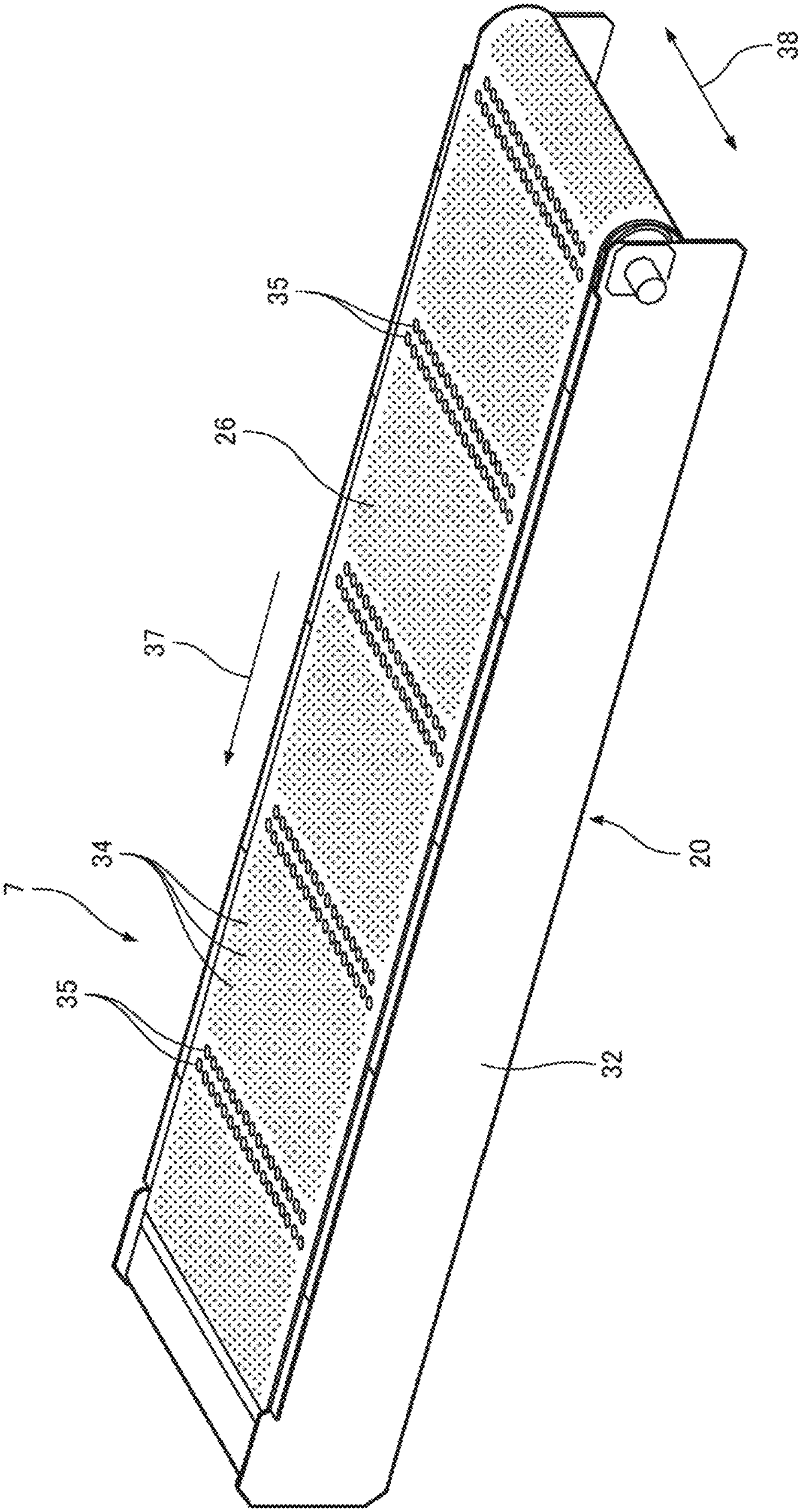
FIG. 3 is a perspective view showing the conveyance device of the image forming apparatus.

Next, the conveyance device 7 of the image forming apparatus 1 will be described with reference to FIGS. 1 to 3. FIG. 2 is a plan view showing the conveyance device 7 of the image forming apparatus 1. FIG. 3 is a perspective view showing the conveyance device 7 of the image forming apparatus 1.

In this embodiment, as shown in FIGS. 1 to 3, the direction orthogonal to a direction of movement 37 of the conveying belt 26 is defined as a belt widthwise direction 38 of the conveying belt 26. The direction of movement 37 is an example of a direction of conveyance defined in CLAIMS.

The frame body 20 includes a pair of side frames 32 opposed to each other in the belt widthwise direction 38. The rollers 21 to 24 are supported between the pair of side frames 32.

When any one of the rollers 21 to 24 is forcedly driven into rotation by a motor or so on, the conveying belt 26 is rotated in one direction and the remaining rollers follow the rotation of the conveying belt 26 to rotate. The conveying belt 26 conveys a sheet 2 toward a position where an image is to be formed on the sheet 2 by the recording heads 16. The conveying belt 26 is colored in black or like colors capable of absorbing light.

The suction device 28 includes: a suction room 30 formed under the support plate 27; and a plurality of suction fans 31 provided in the suction room 30. The support plate 27 forms a ceiling of the suction room 30. In other words, the suction device 28 is located on the side of the conveying belt 26 opposite to the recording heads 16.

In the conveying belt 26, a large number of suction holes 34 and a plurality of through holes 35 for flashing are formed to penetrate both sides of the conveying belt 26. The diameter of the through holes 35 is set larger than the diameter of the suction holes 34. The through holes 35 are formed in a plurality of sets each constituted by two rows of through holes 35 juxtaposed in the direction of movement 37 of the conveying belt 26.

Figure 4:
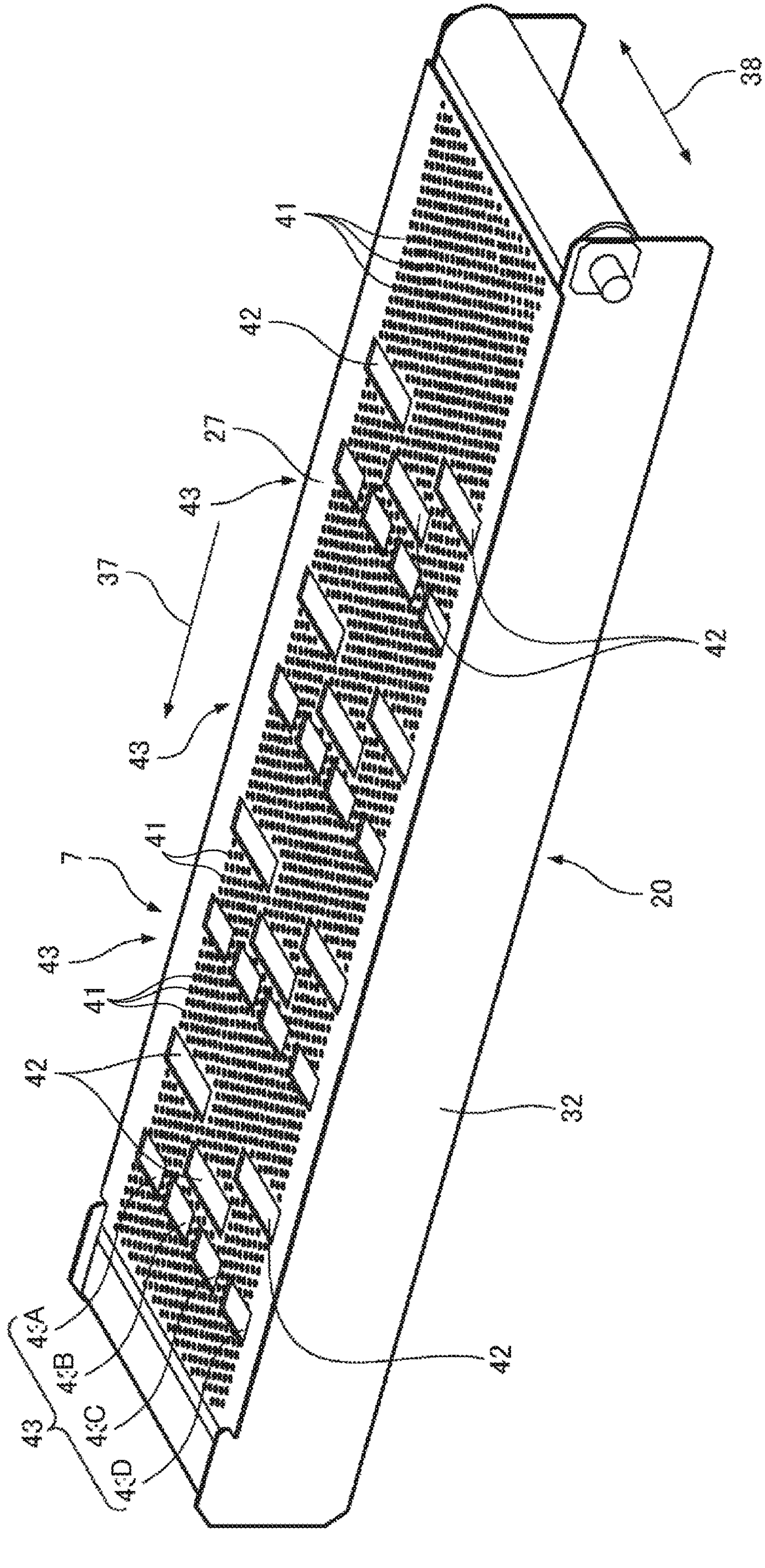
FIG. 4 is a perspective view showing a support plate of the image forming apparatus.

Next, the support plate 27 will be described with reference to FIG. 4. FIG. 4 is a perspective view showing the support plate 27 of the image forming apparatus 1. FIG. 4 shows a state where the conveying belt 26 is removed from the conveyance device 17 shown in FIG. 3 to expose the support plate 27.

As shown in FIG. 4, the support plate 27 includes: a large number of air inlets 34 penetrating through the support plate 27 vertically; a plurality of air vents 43 penetrating through the support plate 27 vertically; and a plurality of communication holes 42 for flashing that penetrate through the support plate 27 vertically. In other words, in the support plate 27, a large number of air inlets 41, a plurality of air vents 43, and a plurality of communication holes 42 for flashing are formed to penetrate through the support plate 27 vertically. The opening area of each individual communication hole 42 is set wider than the opening area of each individual air inlet 41. The communication holes 42 are located, one just under each of the recording heads 16. The suction fans 31 are disposed below the air inlets 41, but are kept from being located below the air vents 43.

For example, each of the air vents 43 is formed of four opening 43A, 43B, 43C, and 43D. For example, the four openings 43A, 43B, 43C, and 43D are arranged in a row along the belt widthwise direction 38. The opening area of each of the openings 43A, 43B, 43C, and 43D is set wider than the opening area of each individual air inlet 41. Four air vents 43 are arranged, one for each of the head units 11 to 14, in the direction of movement 37 of the conveying belt 26.

Figure 5:
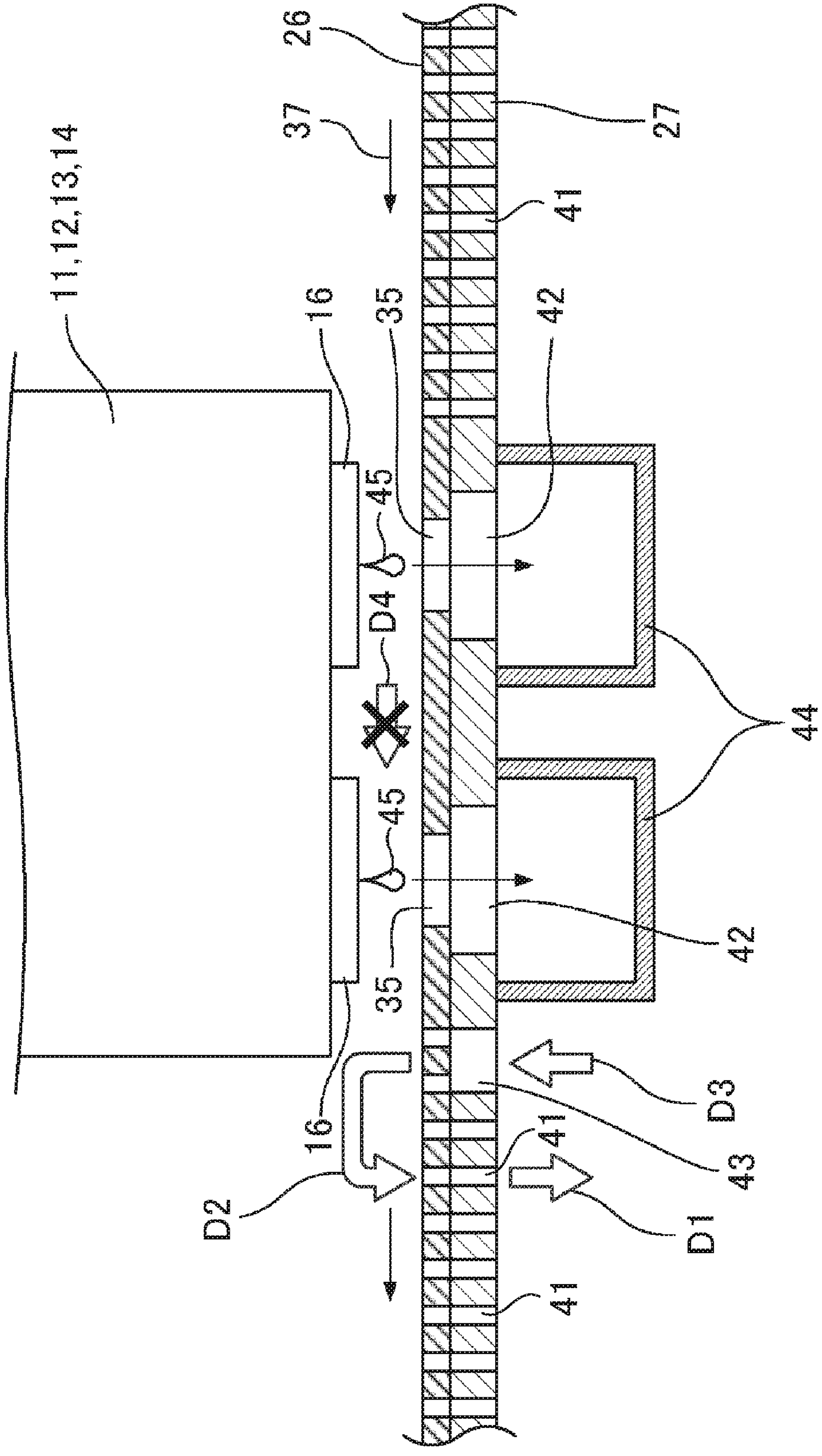
FIG. 5 is a schematic enlarged view of a portion of the image forming apparatus.

Next, flashing of the image forming apparatus 1 will be described with reference to FIG. 5. FIG. 5 is a schematic enlarged view of a portion of the image forming apparatus 1.

As shown in FIG. 5, a plurality of droplet receivers 44 are provided in the suction room 30. The plurality of droplet receivers 44 receive ink droplets 45 having been ejected from the recording heads 16 by flashing without contributing to the formation of the image and having passed through the through holes 35 in the conveying belt 26 and the communication holes 42 in the support plate 27.

A sheet 2 fed from the sheet feed device 4 onto the conveying belt 26 of the printing device 3 is conveyed in the direction of movement 37 by the rotating conveying belt 26. In doing so, the suction fans 31 rotate to reduce the pressure in the suction room 30 and, thus, the outside air flows into the suction room 30 through the suction holes 34 or the through holes 35 in the conveying belt 26 and the air inlets 41 or the communication holes 42 in the support plate 27. In other words, the air sucked by the suction device 28 passes through the air inlets 41 from the side of the conveying belt 26 facing the recording heads 16 toward the suction device 28. This air flow D1 causes the sheet 2 to be attracted to the surface of the conveying belt 26.

Thus, the sheet 2 is conveyed in the direction of movement 37 without leaving the conveying belt 26. During this conveyance, ink droplets are ejected from the recording heads 16 onto the sheet 2 being conveyed, thus forming an image on the sheet 2.

Furthermore, with the conveyance of the sheet 2 and the air flow D1, air flow D2 flowing into the air inlets 41 generates on the side of the conveying belt 26 facing the recording heads 16. Moreover, with the air flow D2, air flow D3 passing through the conveying belt 26 from the side thereof facing the suction device 28 toward the recording heads 16 generates. Specifically, the air flow D3 flows through the air vents 43 in the support plate 43 and the suction holes 34 or the through holes 35 in the conveying belt 26 into the side of the conveying belt 26 facing the recording heads 16. In other words, the air inside the suction device 28 passes through the air vents 43 from the suction device 28 toward the conveying belt 26.

As a result, convection air flow generates in which the air circulates between the suction device 28 and the recording heads 16 with the conveying belt 26 in between. In other words, the flow of air between the suction device 28 and the recording heads 16 is directed. Therefore, ink droplets 45 ejected by flashing are less likely to be swept away by the air flow and thus less likely to adhere to the conveying belt 26 and a sheet 2 or the like being conveyed by the conveying belt 26. As a result, contamination or disturbance of an image formed on the sheet 2 can be prevented.

In the general image recording apparatus described previously, ink ejected from the nozzles during flashing may be swept away between the conveying belt and the nozzles by air flow generated with the conveyance of a sheet and the suction of the air and adhere to the sheet or the like being conveyed by the conveying belt to cause contamination or disturbance of an image formed on the sheet.

Unlike the above, in this embodiment, the support plate 27 includes the air inlets 41 and the air vents 43. Therefore, contamination or disturbance of an image formed on the sheet 2 can be prevented.

In this embodiment, the air vents 43 are located ahead of the recording heads 16 in the direction of movement 37 of the conveying belt 26. Thus, convention air flow between the suction device 28 and the recording heads 16 generates ahead of the recording heads 16 and, therefore, air flow D4 flowing forward from behind the recording heads 16 is difficult to generate. As a result, ink droplets 45 ejected by flashing are less likely to be swept away by the air flow D4 and thus less likely to adhere to the conveying belt 26 and so on.

The description of the embodiment of the present disclosure has so far been given with reference to the drawings. However, the present disclosure is not limited to the above embodiment and can be implemented in various forms without departing from the gist of the present disclosure. Furthermore, the plurality of components disclosed in the above embodiment can be appropriately altered. For example, one or some of all the components described in one embodiment may be added as a component or components of another embodiment or one or some of all the components described in one embodiment may be deleted in another embodiment.

For the sake of ease of understanding of the disclosure, the drawings may be schematic representation, primarily of components. The thickness of each component shown in the drawings, the length thereof, the number of components, the distance between the components, and so on may be different from those of actual components for convenience of creation of the drawings. The structure of each component described in the above embodiment is merely illustrative, not particularly limited, and can be changed variously without substantially departing from the effects of the present disclosure.

INDUSTRIAL APPLICABILITY

The present disclosure is applicable to the field of image forming apparatuses.

What is claimed is:

1. An image forming apparatus comprising:

a recording head that ejects droplets onto a recording medium;

an endless belt that conveys the recording medium toward a position where an image is to be formed on the recording medium by the recording head;

a support plate that supports the endless belt; and a suction device that is located on an opposite side of the recording head relative to the endless belt and sucks the recording medium together with air to attract the recording medium to a surface of the endless belt, the support plate comprising:

an air inlet formed in a first region located above the suction device, the air inlet forming a first flow path through which the air sucked by the suction device passes from a side of the recording head toward a side of the suction device; and an air vent formed at a position different from the air inlet and outside the first region, the air vent forming a second flow path through which the air inside the suction device passes from the side of the suction device toward the side of the recording head in association with suction by the suction device, thereby causing circulation of the air by the first flow path and the second flow path.

2. The image forming apparatus according to claim 1, wherein the air vent is located ahead of the recording head in a direction of conveyance of the recording medium.

* * * * *